US010978707B2

(12) United States Patent
Bakierska et al.

(10) Patent No.: US 10,978,707 B2
(45) Date of Patent: Apr. 13, 2021

(54) LKMNO CATHODE MATERIALS AND METHOD OF PRODUCTION THEREOF

(71) Applicant: UNIWERSYTET JAGIELLONSKI, Cracow (PL)

(72) Inventors: Monika Bakierska, Suwalki (PL); Marcin Molenda, Cracow (PL); Michal Świętosławski, Cracow (PL); Paulina Bielecka, Morawica (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 16/304,229

(22) PCT Filed: May 23, 2017

(86) PCT No.: PCT/IB2017/053022
§ 371 (c)(1),
(2) Date: Nov. 23, 2018

(87) PCT Pub. No.: WO2017/203422
PCT Pub. Date: Nov. 30, 2017

(65) Prior Publication Data
US 2019/0393499 A1 Dec. 26, 2019

(30) Foreign Application Priority Data
May 23, 2016 (PL) ........................................ 417291

(51) Int. Cl.
H01M 4/505 (2010.01)
C01G 53/00 (2006.01)
H01M 4/525 (2010.01)
H01M 10/0525 (2010.01)
H01M 4/02 (2006.01)

(52) U.S. Cl.
CPC ............ H01M 4/505 (2013.01); C01G 53/54 (2013.01); H01M 4/525 (2013.01); H01M 10/0525 (2013.01); *C01P 2002/52* (2013.01); *C01P 2006/40* (2013.01); *H01M 2004/028* (2013.01)

(58) Field of Classification Search
CPC ............ H01M 4/36; H01M 4/62; H01M 4/38; H01M 4/362; H01M 4/505; H01M 4/525; H01M 10/052; H01M 10/0525; H01M 2004/028; C01G 53/54; C01P 2002/52; C01P 2006/40
See application file for complete search history.

(56) References Cited

U.S. PATENT DOCUMENTS 5,738,957 A 4/1998 Amine et al.
6,706,444 B1 3/2004 Numata et al.
6,982,048 B1 1/2006 Atwater et al.
2017/0149060 A1* 5/2017 Sugie .................... H01M 4/505
2017/0162910 A1* 6/2017 Katou ............... H01M 10/0569

FOREIGN PATENT DOCUMENTS

EP 2784853 A1 10/2014
WO 2016012823 A1 1/2016

OTHER PUBLICATIONS

Patent Cooperation Treaty, PCT, International Preliminary Report on Patentability, PCT/IB2017/053022, Applicant: Uniwersytet Jagiellonski, dated Nov. 27, 2018.
International Search Report, PCT/IB2017/053022, dated Sep. 21, 2017.
Polish Patent Office Search Report, Urzad Patentowy, Rzeczypospolitej Polskiej, Jul. 6, 2017R.
Zhuo Zheng et al. "Host Structural Stabilization of Li1.232Mn0.615Ni0.154O2 through K-Doping Attempt: toward Superior Electrochemical Performances." Electromechanica Acta 2016, 188, p. 336-343; DOI:ORG/10.1016/J.ELECTACTA.2015.12.021.
Xu Lu et al. "Modified KCI Molten Salt Method Synthesis of SpinelLiNi0.5Mn1.5O4 with Loose Structure as Cathodes for Li-ion Batteries." International Journal of Electromechanical Science (2014), 9(12), pp. 7253-7265.
D. Lisovytskiy et al: "Phase Transformations in Li—Mn—O Spinels Synthesized by Sol-Gel Method", Materials Science Forum, vol. 443-444, Jan. 1, 2004, p. 311-314, XP055404785.
Monika Bakierska et al: "Enhancement of Electrochemical Performance of LiMn2O4 Spinel Cathode Material by Synergetic Substitution with Ni and S", Materials, vol. 9, No. 5, May 13, 2016, p. 366, XP055404783.
Terrill B Atwater et al: "Lithium Potassium Manganese Mixed Metal Oxide Material for Rechargeable Electrochemical Cells", Jan. 1, 2010, XP055404771.
Lithium Batteries and Cathode Materials, M. Stanley Whittingham, Chem. Rev. 2004, 104, 4271-4301, Received Jun. 16, 2004.
Sciencedirect, Journal of Power Sources 174 (2007) 449-456, An Overview of Positive-Electrode Materials for Advanced Lithium-Ion Batteries, Tsutomu Ohzuku, Ralph J. Brodd, Available Online Jun. 28, 2007.
Journal of Power Sources, Recent Developments in Cathode Materials for Lithium Ion Batteries, Jeffrey W. Fergus, Received Jun. 29, 2009.
Sciencedirect, A Study on Capacity Fading of Lithium-Ion Battery With Manganese Spinel Positive Electrode During Cycling, Li Yang, Michio Takahashi, Baofeng Wang, Received May 16, 2005.
Factors Influencing the Capacity Fade of Spinel Lithium Manganese Oxides, Youngjoon Shin and Arumugam Manthiram, Manuscript Submitted Jun. 11, 2003, Journal of the Electrochemical Society.

(Continued)

*Primary Examiner* — Stephen J Yanchuk
(74) *Attorney, Agent, or Firm* — Flener IP & Business Law; Zareefa B. Flener

(57) ABSTRACT

LKMNO cathode materials based on a lithium-manganese spinel modified synergetically with potassium and nickel, and a method of production thereof are disclosed. The LKMNO cathode materials are characterised by a reversible gravimetric capacity in relation to lithium of at least 250 mAh/g after 80 operation cycles under a current load of 1 C, so that they are suitable for application in lithium-ion batteries with a high energy density.

9 Claims, No Drawings

(56) References Cited

OTHER PUBLICATIONS

Effects of Ni-Ion Doping on Electrochemical Characteristics of Spinel LIMN2O4 Powders Prepared by a Spray-Drying Method, Received: Sep. 20, 2005, J Solid State Electrochem (2007).
Electrochimica Acta, Solution-combustion synthesized nickel-substituted spinel cathode materials (LiNixMn2-xO4; 0≤x≤0.2) for lithium ion battery:enhancing energy storage, capacity retention, and lithium ion transport, Mesfin A. Kebede, Nikiwe Kunjuzwa, Charl J. Jafta, Mkhulu K. Mathe, Kenneth I. Ozoemena, Received Jul. 24, 2013.
RSC Advances, Characterization of cathode from LiNixMn2—xO4 nanofibers by electrospinning for Li-ion batteries, Jongwei Zhou, Xianan Ding, Guicheng Liu, Zhan Gao, Guofeng Xu, and Xindong Wang, Received Oct. 20, 2015.
Synthesis of Spinel LiNi0.5Mn1.5O4 by a Wet Chemical Method and Characterization for Lithium-Ion Secondary Batteries, Luz Quispe, Marco A. Condoretty, Kideki Kawasaki, Seiji Tsuji, Heidy Visbal, Hitomi Miki, Kohji Nagashima and Kazuyuki Hirao, Received Sep. 30, 2014.
Chemistry of Materials, Electronic and Electrochemical Properties of Li1—xMn1.5Ni0.5O4 Spinel Cathodes as a Function of Lithium Content and Cation Ordering, Zach Moorhead-Rosenberg, Ashfia Huq, John B. Goodenough, and Arumugam Manthiram, Received: Apr. 13, 2015.
The Effect of K-Ion on the Electrochemical Performance of Spinel LiMn2O4, Lilong Xiong, Youlong Xu, Xiang Xiao, Jie Wang, and Yutao Li, Electronic Materials Research Laboratory, Received Date: Aug. 18, 2014.
Lithium Potassium Manganese Mixed Metal Oxide Material for Rechargeable Electrochemical Cells, Terrill B. Atwater and Alvin J. Salkind.
Synthesis and characterisation of sulphided lithium manganese spinels LiMn2O4-ySy prepared by sol-gel method, M. Molenda, R. Dziembaja, D. Majda, M. Dudek, Sciencedirect, Solid State Ionics 176 (2005) 1705-1709.
Sciencedirect, Optimization of Sulphur Content in LIMN2O4-YSY Spinels as Cathode Materials for Lithium-Ion Batteries, M. Bakierska, M. Molenda, R. Dziembag, Procedia Engineering 98 (2014) 20-27.
Solid State Ionics, Structural and Electrochemical Characterization of Sulphur-Doped Lithium Manganese Spinel Cathode Materials for Lithium Ion Batteries, M. Molenda, M. Bakierska, D. Majda, M. Swietoslawski, R. Dziembaj, Receied Aug. 19, 2014.

Plasma-Assisted Sulfur Doping of LIMN2O4, for High-Performance Lithium-Ion Batteries, Jiang, Liu, Zhang, and Wang, Received Oct. 21, 2015.
New Investigation of Fluorine-Substituted Spinel LIMN2O4-XFX by Using Sol-Gel Process, J.T. Son, H.G. Kim, Received Aug. 30, 2004, Sciencedirect.
Influence of Fluoride Substitution on the Physicochemical Properties of LIMN2O4 Cathode Materials for Lithium-Ion Batteries, PaulosTaddesseShibeshi, V. Veeraiah, A.V. PrasadaRao, International Journal of Scientific & Engineering Research vol. 3, Issue 7, Jul. 2012.
Journal of Power Sources, Influence of S and Ni co-doping on structure, band gap and electrochemical properties of lithium manganese oxide synthesized by soft chemical method, M.W. Raja, S. Mahanty, R.N. Basu, Received Jan. 12, 2009.
Synthesis and Electrochemical Properties of Nanostructured LIALXMN2-XO4-YBRY Particles, Yudai Huang, Rongrong Jiang, Shu-Juan Bao, Zhifang Dong, Yali Cao, Dianzeng Jia, Zaiping Guo, Received: Sep. 17, 2009, J Solid State Electrochem.
Synthesis and Characterization of 5 V LICOXNIYMN2-X-YO4 (X=Y=0.25) Cathode Materials for Use in Rechargeable Lithium Batteries, S. Rajakumar, R. Thirunakaran, A. Sivashanmugam, Jun-Ichi Yamaki, S. Gopukumar, Received: Nov. 25, 2009, J Appl Electrochem.
Effects of magnesium and fluorine co-doping on the structural and electrochemical performance of the spinel LiMn2O4 cathode materials, Weicheng Wen, Bowei Ju, Xianyou Wang, Chun Qu, Hongbo Shu, Xiukang Yang, Received Jul. 24, 2014, Electrochimica Acta.
The Sol-Gel Process, Larry L. Hench and Jon K. West, Chem. Rev. 1990, 90. 33-72, Received May 16, 1989.
History of Sol-Gel Science and Technology (Review), Y. Dimitriev, Y. Ivanova, R. Iordanova, Received Mar. 5, 2008, Journal of the University of Chemical Technology and Metallurgy, 43, 2, 2008, 181-192.
Stabilization of the Spinel Structure of Li1ρdMn2-dO4 obtained by sol-gel method, R. Dziembaj, M. Molenda, Journal of Power Sources 119-121 (2003) 121-124.
Synthesis, thermal and electrical properties of Li1+dMn2dO4 prepared by a sol-gel method, Science Direct, R. Dziembaj, M. Molenda, D. Majda, S. Walas, Received Aug. 21, 2001, Solid State Ionics 157 (2003) 81-87.
Lithium Potassium Manganese Mixed Metal Oxide Material for Rechargeable Electrochemical Cells, Terrill B. Atwater and Alvin J. Salkind; Army Communications—Electronics Research Development and Eng Ctr Ft Monmouth NJ; Accession No. ADA528193; Report Date Jan. 1, 2010; available at https://apps.dtic.mil/sti/citations/ADA528193.

* cited by examiner

LKMNO CATHODE MATERIALS AND METHOD OF PRODUCTION THEREOF

The invention relates to cathode materials based on a lithium-manganese spinel ($LiMn_2O_4$, LMO) synergetically modified with potassium and nickel ($Li_{1-x}K_xMn_{2-y}Ni_yO_4$, LKMNO, where $0.01 \leq x \leq 0.15$ and $0.01 \leq y \leq 0.2$), and to a method of preparation of such materials. Within its assumptions, the invention may be used for energy storage, particularly in lithium-ion (Li-ion) batteries.

Nowadays, mainly layered lithium-cobalt oxide ($LiCoO_2$, LCO) and its derivatives are used as cathode materials in commercially available Li-ion batteries. However, LCO exhibits a limited practical capacity in its pure form, approx. 140 mAh/g. This is accompanied by a high price, toxicity of cobalt and safety reasons. Thus, application of a lithium-manganese spinel ($LiMn_2O_4$, LMO) seems to be a good alternative. This material has a similar practical capacity (approx. 140 mAh/g), is thermally stable, and additionally inexpensive and less environmentally burdensome [1-3]. A stoichiometric LMO spinel, although used commercially in battery packs for electric vehicles (EV), still has limited applications. Most of all, it is caused by its unstable crystalline structure at the operating temperature of the battery, and by solubility of manganese ions in the liquid electrolyte, both leading to a drop in the capacity and a deterioration of the battery life [4,5]. Methods for improvement of the spinel stability and electrochemical properties, i.a. by a modification of its chemical composition, are known in the literature. The approach applied most commonly consists in a partial substitution of $Mn^{3+}$ ions with other 3d transition metal ions, e.g. Ni, leading to a stabilisation of the spinel structure. Such materials (LMNO) are characterised by a capacity reaching approx. 140 mAh/g (under a current load of 1 C); also, they may provide a high voltage in relation to lithium and a higher specific energy than $LiMn_2O_4$ [6-10]. The effect of the LMO spinel doping in the lithium sublattice was also studied [11-13], however to a slight extent only. It was observed that a modification of spinel materials with potassium (LKMO) improves the cyclability and performance of the batteries under higher current loads. The potassium-substituted spinels have a capacity of approx. 135 mAh/g (1 C). The third possibility of modification of the composition of the LMO-based spinels presented in the literature consists in a substitution in the anionic sublattice (LMOS, LMOF) [14-19]. Materials of such a type are stable and characterised by improved (in relation to the stoichiometric spinel $LiMn_2O_4$) electrochemical properties, and have a capacity for the LMOS of at least 110 mAh/g (1 C).

Our studies on spinel materials have proved unexpectedly that simultaneous doping of the LMO spinel in the lithium and manganese sublattices with potassium and nickel, leading to spinel materials with a general formula $Li_{1-x}K_xMn_{2-y}Ni_yO_4$ (LKMNO), where $0.01 \leq x \leq 0.15$ and $0.01 \leq y \leq 0.2$, does not lead to direct and simple adding of properties of the materials, characteristic for a given type of modification. In fact, the materials according to the invention exhibit completely new and surprising features. The synergetic effect of the introduction of potassium and nickel to the spinel structure causes an extraordinary, unexpected increase in the capacity, reaching up to 70% (in relation to the theoretical capacity of $LiMn_2O_4$, amounting to approx. 148 mAh/g), so far unobtainable by other materials based on the LMO spinel (at the present stage, the gravimetric capacity of the LKMNO system is at least 250 mAh/g under a current load of 1 C, without optimisations of the electrode composition and thickness). Additionally, the materials being the subject of the invention are characterised by a high working potential (in the range of 4.0-4.7 V), an unusually high coulombic reversibility (more than 99%), as well as a cell operation efficiency under high-current conditions (possibility to transfer (without damage) current loads of the order of 100C-200C). Also, it is noteworthy that other attempts to use a combination of the aforementioned modifications have not given such an effect [20-23].

According to the invention, the LKMNO spinel systems are obtained by a sol-gel method [24-27], based on the processes of hydrolysis and condensation, enabling to obtain homogeneous products of a high purity in a nanometric form at low temperatures. Moreover, the proposed method for preparation of LKMNO materials is suitable for a wide scale use, unlike the majority of preparation techniques described in the literature, mostly for the economic reasons. In addition, preparation of LKMNO nanomaterials by the method of high-temperature reaction in the solid phase is impossible.

The invention relates to a method of preparation of an LKMNO cathode material ($Li_{1-x}K_xMn_{2-y}Ni_yO_4$, where $0.01 \leq x \leq 0.15$ and $0.01 \leq y \leq 0.2$) having a high energy density, wherein stoichiometric weighed amounts of lithium, potassium, manganese and nickel precursors are dissolved in a minimal amount of water, ensuring a total dissolution of the substrates, and simultaneously, a protective atmosphere of an inert gas is used, and then, an ammonia solution having a concentration of 15-28% is introduced to the solution, until a pH value in the range of 8.5-11 is obtained, and next, after 30-60 min, the formed sol is subjected to polycondensation, aging and drying processes, until a xerogel is obtained, which is calcined subsequently in the temperature range of 200-900° C.

Preferably, lithium acetate, lithium nitrate(V), lithium hydroxide or lithium carbonate and hydrates thereof are used as lithium precursors.

Preferably, potassium nitrate(V), potassium acetate, potassium hydroxide or potassium carbonate and hydrates thereof are used as potassium precursors.

Preferably, manganese(II) acetate or manganese(II) nitrate(V) and hydrates thereof are used as manganese precursors.

Preferably, nickel(II) acetate or nickel(II) nitrate(V) and hydrates thereof are used as nickel precursors.

Preferably, the steps up to the formation of the sol are carried out in the temperature range of 10-50° C. in an atmosphere of an inert gas selected from argon, nitrogen or helium.

Preferably, the polycondensation, aging and drying processes are carried out in the atmosphere of air or synthetic air for 24-96 h at a temperature of 60-105° C.

Preferably, the xerogel calcination process is carried out in two steps in the temperature range of 200-900° C. in the atmosphere of air or synthetic air.

The invention includes also the LKMNO cathode material obtained by the process described above.

Therefore, the key novel feature of the filed application consists in a combination of the sol-gel preparation method applied and the synergetic modification of the chemical composition of the LMO spinel using proper contents of the dopants, namely potassium and nickel, which leads to a significant and unexpected improvement of the utility parameters of lithium batteries. None of the modifications of the LMO spinel material presented so far allowed for obtaining such results, as well as the LKMOS, LMNOS, LKMNOS combinations obtained by the sol-gel technique which were tested by us.

The subject of the invention is described in more detail in the following embodiments.

Example 1 (Comparative)

To obtain 10 g of the $Li_{0.9}K_{0.1}Mn_2O_{3.99}S_{0.01}$ (LKMOS) spinel material, 4.9835 g of lithium acetate dihydrate, 0.5510 g of potassium nitrate(V), and 26.6166 g of manganese(II) acetate tetrahydrate were weighed. The weighed amounts of the substrates were transferred quantitatively to a reactor (atmosphere: Ar, 99.999%) and dissolved in approx. 50 ml of distilled water. After the dissolution of the substrates, 28.74 g of 25% ammonia solution earlier mixed with 188 µl of 20% ammonium sulphide solution, were added to the solution. After approx. 30 min, the formed sol was transferred to ceramic crucibles and dried at a temperature of 90° C. for 3-4 days. The obtained xerogel was calcined first at a temperature of 300° C. for 24 h (heating rate of 1° C./min), and the product of the first calcination was then calcined again at 650° C. for 6 h (heating rate of 5° C./min). Both calcinations were carried out in the atmosphere of air.

The obtained spinel was characterised by a nanometric size of the crystallites ($D_{XRD}$=32 nm). It was proved that an introduction of potassium and sulphur to the LMO spinel structure contributed into a stabilisation of the structure and elimination of an unfavourable phase transformation (characteristic for the stoichiometric LMO spinel) near room temperature, which was confirmed by differential scanning calorimetry (DSC) tests. The LKMOS material exhibited an electrical conductivity of $6.26 \cdot 10^{-4}$ S/cm at a temperature of 25° C., and an electrical conductivity activation energy $E_a$=0.22 eV. Electrochemical tests showed that the obtained material is characterised by a gravimetric capacity in relation to lithium reaching 132 mAh/g—after 40 cycles of operation under a current load of 1 C.

Example 2 (Comparative)

To obtain 10 g of the $LiMn_{1.9}Ni_{0.1}O_{3.99}S_{0.01}$ (LMNOS) spinel material, 5.6254 g of lithium acetate dihydrate, 25.6776 g of manganese(II) acetate tetrahydrate, and 1.3722 g of nickel(II) acetate tetrahydrate were weighed. The weighed amounts of the substrates were transferred quantitatively to a reactor (atmosphere: Ar, 99.999%) and dissolved in approx. 50 ml of distilled water. After the dissolution of the substrates, 29.37 g of 25% ammonia solution earlier mixed with 188 µl of 20% ammonium sulphide solution, were added to the solution. After approx. 30 min, the formed sol was transferred to ceramic crucibles and dried at a temperature of 90° C. for 3-4 days. The obtained xerogel was calcined first at a temperature of 300° C. for 24 h (heating rate of 1° C./min), and the product of the first calcination was then calcined again at 650° C. for 6 h (heating rate of 5° C./min). Both calcinations were carried out in the atmosphere of air.

The obtained spinel was characterised by a nanometric size of the crystallites ($D_{XRD}$=48 nm). It was proved that an introduction of nickel and sulphur to the LMO spinel structure contributed into a stabilisation of the structure and elimination of an unfavourable phase transformation (characteristic for the stoichiometric LMO spinel) near room temperature, which was confirmed by differential scanning calorimetry (DSC) tests. The LMNOS material exhibited an electrical conductivity of $5.974 \cdot 10^{-5}$ S/cm at a temperature of 25° C. and an electrical conductivity activation energy $E_a$=0.32 eV. Electrochemical tests showed that the obtained material is characterised by a gravimetric capacity in relation to lithium reaching 129 mAh/g—after 40 cycles of operation under a current load of 1 C.

Example 3 (Comparative)

To obtain 10 g of the $Li_{0.99}K_{0.01}Mn_{1.9}Ni_{0.1}O_{3.99}S_{0.01}$ (LKMNOS) spinel material, 5.5598 g of lithium acetate dihydrate, 0.0557 g of potassium nitrate(V), 25.6352 g of manganese(II) acetate tetrahydrate and 1.3699 g of nickel (II) acetate tetrahydrate were weighed. The weighed amounts of the substrates were transferred quantitatively to a reactor (atmosphere: Ar, 99.999%) and dissolved in approx. 50 ml of distilled water. After the dissolution of the substrates, 29.33 g of 25% ammonia solution previously mixed with 188 µl of 20% ammonium sulphide solution, were added to the solution. After approx. 30 min, the formed sol was transferred to ceramic crucibles and dried at a temperature of 90° C. for 3-4 days. The obtained xerogel was calcined first at a temperature of 300° C. for 24 h (heating rate of 1° C./min), and the product of the first calcination was then calcined again at 650° C. for 6 h (heating rate of 5° C./min). Both calcinations were carried out in the atmosphere of air.

The obtained spinel was characterised by a nanometric size of the crystallites ($D_{XRD}$=49 nm). It was proved that an introduction of potassium, nickel and sulphur to the LMO spinel structure contributed into a stabilisation of the structure and elimination of an unfavourable phase transformation (characteristic for the stoichiometric LMO spinel) near room temperature, which was confirmed by differential scanning calorimetry (DSC) tests. The LKMNOS material exhibited an electrical conductivity of $4.26 \cdot 10^{-5}$ S/cm at a temperature of 25° C. and an electrical conductivity activation energy $E_a$=0.32 eV. Electrochemical tests showed that the obtained material is characterised by a gravimetric capacity in relation to lithium reaching 108 mAh/g—after 30 cycles of operation under a current load of 1 C.

Example 4

To obtain 10 g of the $Li_{0.99}K_{0.01}Mn_{1.9}Ni_{0.1}O_4$ (LKMNO) spinel material, 5.5635 g of lithium acetate dihydrate, 0.0557 g of potassium nitrate(V), 25.6533 g of manganese (II) acetate tetrahydrate, and 1.3709 g of nickel(II) acetate tetrahydrate were weighed. The weighed amounts of the substrates were transferred quantitatively to a reactor (atmosphere: Ar, 99.999%) and dissolved in approx. 50 ml of distilled water. After the dissolution of the substrates 29.33 g of 25% ammonia solution were added to the solution. After approx. 30 min, the formed sol was transferred to ceramic crucibles and dried at a temperature of 90° C. for 3-4 days. The obtained xerogel was calcined first at a temperature of 300° C. for 24 h (heating rate of 1° C./min), and the product of the first calcination was then calcined again at 650° C. for 6 h (heating rate of 5° C./min). Both calcinations were carried out in the atmosphere of air.

The obtained spinel was characterised by a nanometric size of the crystallites ($D_{XRD}$=52 nm). It was proved that an introduction of potassium and nickel to the LMO spinel structure contributed into a stabilisation of the structure and elimination of an unfavourable phase transformation (characteristic for the stoichiometric LMO spinel) near room temperature, which was confirmed by differential scanning calorimetry (DSC) tests. The LKMNO material exhibited an electrical conductivity of 1.2240 S/cm at a temperature of 25° C. and an electrical conductivity activation energy $E_a=0.35$ eV. Electrochemical tests showed that the obtained material is characterised by a gravimetric capacity in relation to lithium of at least 250 mAh/g after 80 operation cycles under a current load of 1 C.

REFERENCES

[1] M. S. Whittingham, Lithium Batteries and Cathode Materials, Chem. Rev. 104 (2004) 4271-4301.

[2] T. Ohzuku, R. J. Brodd, An overview of positive-electrode materials for advanced lithium-ion batteries, J. Power Sources 174 (2007) 449-456.

[3] J. W. Fergus, Recent developments in cathode materials for lithium ion batteries, J. Power Sources 195 (2010) 939-954.

[4] L. Yang, M. Takahashi, B. Wang, A study on capacity fading of lithium-ion battery with manganese spinel positive electrode during cycling, Electrochim. Acta 51 (2006) 3228-3234.

[5] Y. Shin, A. Manthiram, Factors Influencing the Capacity Fade of Spinel Lithium Manganese Oxides, J. Electrochem. Soc. 151 (2004) A204.

[6] H. M. Wu, J .P. Tu, X. T. Chen, Y. Li, X. B. Zhao, G. S. Cao, Effects of Ni-ion doping on electrochemical characteristics of spinel $LiMn_2O_4$ powders prepared by a spray-drying method, J. Solid State Electrochem. 11 (2007) 173-176.

[7] M. A. Kebede, N. Kunjuzwa, C. J. Jafta, M. K. Mathe, K. I. Ozoemena, Solution-combustion synthesized nickel-substituted spinel cathode materials ($LiNi_xMn_{2-x}O_4$; $0 \le x \le 0.2$) for lithium ion battery: enhancing energy storage, capacity retention, and lithium ion transport, Electrochim. Acta 128 (2014) 172-177.

[8] H. Zhou, X. Ding, G. Liu, Z. Gao, G. Xu, X. Wang, Characterization of cathode from $LiNi_xMn_{2-x}O_4$ nanofibers by electrospinning for Li-ion batteries, RSC Adv. 5 (2015) 108007-108014.

[9] L. Quispe, M. A. Condoretty, H. Kawasaki, S. Tsuji, H. Visbal, H. Miki, K. Nagashima, K. Hirao, Synthesis of Spinel $LiNi_{0.5}Mn_{1.5}O_4$ by a Wet Chemical Method and Characterization for Lithium-Ion Secondary Batteries, Journal of the Ceramic Society of Japan 123 (2015) 38-42.

[10] Z. Moorhead-Rosenberg, A. Huq, J. B. Goodenough, A. Manthiram, Electronic and Electrochemical Properties of $Li_{1-x}Mn_{1.5}Ni_{0.5}O_4$ Spinel Cathodes As a Function of Lithium Content and Cation Ordering, Chem. Mater. 27 (2015) 6934-6945.

[11] L. Xiong, Y. Xu, X. Xiao, J. Wang, Y. Li, The Effect of K-Ion on the Electrochemical Performance of Spinel $LiMn_2O_4$, Electronic Materials Letters 11/1 (2015) 138-142.

[12] T. B. Atwater, A. J. Salkind, Lithium Potassium Manganese Mixed Metal Oxide Material for Rechargeable Electrochemical Cells, Army Communications—US Army Research Development & Engineering Comd, 2010.

[13] T. B. Atwater, A. J. Salkind, Potassium stabilized manganese dioxide for lithium rechargeable batteries, U.S. Pat. No. 6,982,048 B1, 2006.

[14] M. Molenda, R. Dziembaj, D. Majda, M. Dudek, Synthesis and characterisation of sulphided lithium manganese spinels $LiMn_2O_{4-y}S_y$ prepared by sol-gel method, Solid State Ionics 176 (2005) 1705-1709.

[15] M. Bakierska, M. Molenda, R. Dziembaj, Optimization of sulphur content in $LiMn_2O_{4-y}S_y$ spinels as cathode materials for lithium-ion batteries, Procedia Eng. 98 (2014) 20-27.

[16] M. Molenda, M. Bakierska, D. Majda, M. Świętosławski, R. Dziembaj, Structural and electrochemical characterization of sulphur-doped lithium manganese spinel cathode materials for lithium ion batteries, Solid State Ionics 272 (2015) 127-132.

[17] Q. Jiang, D. Liu, H. Zhang, S. Wang, Plasma-Assisted Sulfur Doping of $LiMn_2O_4$ for High-Performance Lithium-Ion Batteries, J. Phys. Chem. C 119/52 (2015) 28776-28782.

[18] J. T. Son, H. G. Kim, New investigation of fluorine-substituted spinel $LiMn_2O_{4-x}F_x$ by using sol-gel process, J. Power Sources 147 (2005) 220-226.

[19] P. T. Shibeshi, V. Veeraiah, A. V. PrasadaRao, Influence of Fluoride Substitution on the Physicochemical Properties of $LiMn_2O_4$ Cathode Materials for Lithium-ion Batteries, IJSER 3/7 (2012) 1-7.

[20] M. W. Raja, S. Mahanty, R. N. Basu, Influence of S and Ni co-doping on structure, band gap and electrochemical properties of lithium manganese oxide synthesized by soft chemical method, J. Power Sources 192 (2009) 618-626

[21] Y. Huang, R. Jiang, S. J. Bao, Z. Dong, Y. Cao, D. Jia, Z. Guo, Synthesis and electrochemical properties of nano-structured $LiAl_xMn_{2-x}O_{4-y}Br_y$ particles, J. Solid State Electrochem. 13 (2009) 799-805.

[22] S. Rajakumar, R. Thirunakaran, A. Sivashanmugam, J. Yamaki, S. Gopukumar, Synthesis and characterization of 5 V $LiCo_xNi_yMn_{2-x-y}O_4$ (x=y=0.25) cathode materials for use in rechargeable lithium batteries, J. Appl. Electrochem 41 (2011) 129-136.

[23] W. Wen, B. Ju, X. Wang, C. Wu, H. Shu, X. Yang, Effects of magnesium and fluorine co-doping on the structural and electrochemical performance of the spinel $LiMn_2O_4$ cathode materials, Electrochim. Acta 147 (2014) 271-278.

[24] L. L. Hench, J. K. West, The Sol-Gel Process, Chem. Rev. 90 (1990) 33-72.

[25] Y. Dimitriev, Y. Ivanova, R. Iordanova, History of sol-gel science and technology (review), J. Univ. Chem. Technol. Metallurgy 43/2 (2008) 181-192.

[26] R. Dziembaj, M. Molenda, Stabilization of the spinel structure in $Li_{1+\delta}Mn_{2-\delta}O_4$ obtained by sol-gel method, J. Power Sources 119-121 (2003) 121-124.

[27] R. Dziembaj, M. Molenda, D. Majda, S. Walas, Synthesis, thermal and electrical properties of $Li_{1+\delta}Mn_{2-\delta}O_4$ prepared by a sol-gel method, Solid State Ionics 157 (2003) 81-87.

The invention claimed is:

1. A method of preparation of an LKMNO cathodic material $Li_{1-x}K_xMn_{2-y}Ni_yO_4$, where $0.01 \le x \le 0.15$ and $0.01 \le y \le 0.2$ having a high energy density, wherein stoichiometric weighed amounts of lithium, potassium, manganese and nickel precursors are dissolved in a minimal amount of water ensuring a total dissolution of the substrates and simultaneously a protective atmosphere of an inert gas is used, and then, an ammonia solution having a concentration of 15-28% is introduced to the solution, until a pH value in the range of 8.5-11 is obtained, and next, after 30-60 min, the formed sol is subjected to polycondensation, aging and drying processes, until a xerogel is obtained, which is calcinated subsequently in the temperature range of 200-900° C.

2. The method according to claim 1, wherein a lithium precursor, lithium acetate, lithium nitrate (V), lithium hydroxide or lithium carbonate and hydrates thereof are used.

3. The method according to claim 1 wherein as a potassium precursor, potassium nitrate (V), potassium acetate, potassium hydroxide or potassium carbonate and hydrates thereof are used.

4. The method according to claim 1, wherein as a manganese precursor, manganese (II) acetate or manganese (II) nitrate (V) and hydrates thereof are used.

5. The method according to claim 1, wherein as a nickel precursor, nickel (II) acetate or nickel (II) nitrate (V) and hydrates thereof are used.

6. The method according to claim 1, wherein the steps up to the formation of the sol are carried out in the temperature range of 10-50° C. in an atmosphere of an inert gas selected from argon, nitrogen or helium.

7. The method according to claim 1, wherein the polycondensation, aging and drying processes are carried out in the atmosphere of air or synthetic air for 24-96 h at a temperature of 60-105° C.

8. The method according to claim 1, wherein the xerogel calcination process is carried out in two steps in the temperature range of 200-900° C. in the atmosphere of air or synthetic air.

9. An LKMNO cathodic material obtained by the method of claim 1.

* * * * *